United States Patent

Coates et al.

[11] Patent Number: 5,989,461
[45] Date of Patent: Nov. 23, 1999

[54] CIRCULAR UV POLARIZER

[75] Inventors: David Coates, Merley Wimborne; Emma Jolliffe, Weymouth; Patrick Nolan, Poole, all of United Kingdom

[73] Assignee: Merck Patent Gesellschaft mit Beschrankter Haftung, Germany

[21] Appl. No.: 08/888,363

[22] Filed: Jul. 3, 1997

[30] Foreign Application Priority Data

Jul. 4, 1996 [EP] European Pat. Off. ............ 96110805

[51] Int. Cl.$^6$ .............. F21V 9/14; C09K 19/52; C09K 19/20; G02F 1/1335
[52] U.S. Cl. .............. 252/585; 252/299.01; 252/299.64; 349/98
[58] Field of Search .............. 252/299.01, 585, 252/299.64; 359/63

[56] References Cited

U.S. PATENT DOCUMENTS

| | | | |
|---|---|---|---|
| 5,401,437 | 3/1995 | Im | 252/299.01 |
| 5,538,768 | 7/1996 | Marden et al. | 428/1 |
| 5,560,864 | 10/1996 | Goulding | 252/299.01 |
| 5,622,648 | 4/1997 | Parri et al. | 252/299.66 |
| 5,658,490 | 8/1997 | Sharp et al. | 252/299.01 |
| 5,691,789 | 11/1997 | Li et al. | 349/98 |
| 5,705,093 | 1/1998 | Coates et al. | 252/299.01 |
| 5,723,066 | 3/1998 | Coates et al. | 252/299.01 |
| 5,746,940 | 5/1998 | Coates et al. | 252/299.01 |
| 5,750,051 | 5/1998 | Goulding et al. | 252/299.65 |

*Primary Examiner*—C. H. Kelly
*Attorney, Agent, or Firm*—Millen, White, Zelano, & Branigan, P.C.

[57] ABSTRACT

The invention relates to a circular UV polarizer based on a polymerized mesogen being obtainable by curing by actinic radiation or by heat of a polymerizable composition which comprises the following components:

a) a liquid mesogenic component A composed of one or more achiral mesogenic compounds having at least one polymerizable end group optionally linked via a spacer group to the mesogenic core, b) a component B composed of one or more chiral compounds in such an amount that the maximum wavelength of reflection ($\lambda_{max}$) of the composition is between 320 and 440 nm, inclusive, and c) a photoinitiator or thermal initiator component C.

17 Claims, 1 Drawing Sheet

CIRCULAR UV POLARIZER

The invention relates to a circular UV polarizer and to the use of such a circular UV polarizer as a spatial UV modulator.

There is a high demand for circular UV polarizers, since they allow production of spatial UV modulators, e.g., for printer heads or photocopy machine, for creating UV patterns for UV curing of polymers, in particular in microelectronics. Moreover, circular UV polarizers allow production of linearly polarized UV light if they are laminated to a suitable λ/4 plate with a retardation value of 0.25 times that of the wavelength of light transmitted as circularly polarized light.

Furthermore, they can be used for tuning the intensity of UV radiation for optical UV measurement equipment, in particular for optical work benches, optical computing or for CCD coupled devices. Other fields of application are in information displays, in particular color displays, in the advertising industry, public information displays including static or animated displays, based on the UV pattern monitored on a luminescent screen.

Conventional circular polarizers are used to polarize visible light. The European Patent application EP 0 606 940 discloses a liquid crystal polarizer based on a cholesteric polymer material comprising a dye which absorbs light in the visible region.

The International patent application WO 93/10639 suggests a display apparatus in which the visible light emitted by UV stimulated phosphor elements is switched on or off with the aid of a liquid crystal TN device using crossed polarizers. However, it is more efficient to select each pixel directly by UV radiation that is turned on or off by a TN device having crossed UV polarizers being composed of a circular UV polarizer according to the invention and a suitable λ/4 plate.

The present invention provides a circular UV sheet polarizer based on polymerized mesogens, characterized in that said polymerized mesogens are obtainable by curing of a polymerizable composition using actinic radiation or heat. The polymerizable composition comprises:

a) a mesogenic component A comprising one or more achiral mesogenic compounds having at least one polymerizable end group optionally linked via a spacer group to the mesogenic core, b) a mesogenic component B comprising one or more chiral mesogenic compounds which may be polymerizable compounds or non-polymerizable compounds, the polymerizable compounds having at least one polymerizable end group optionally linked via a spacer group to the mesogenic core, in such an amount that the maximum wavelength of reflection ($\lambda_{max}$) of the composition is between 320 and 440 nm, inclusive, and c) a photoinitiator component or a thermal initiator component C.

Preferably at least one of the components A and B is a liquid crystalline component.

In a first embodiment the component B comprises one or more polymerizable compounds. Preferably the component B is a liquid crystalline component.

In a second embodiment the component B comprises at least one non-polymerizable compound.

Actinic radiation here does encompass UV radiation as well as light in the range of the visible spectrum. Compounds absorbing in this range of wavelengths and decomposing into reactive species initiating polymerization of the precursor are simply called photoinitiators throughout the text.

Preferably the curing of the precursor i.e. the polymerizable composition is initiated by actinic radiation and not by heat. Most preferred is UV irradiation.

Among exemplary preferred embodiments are those where the invention relates to:

a) a circular UV polarizer, wherein said mesogenic component A comprises at least one compound of formula I in which
P is a polymerizable group,
X and Y are each independently —O—, —S—, —COO—, —OCO—, —OCOO—, —SCO—, —COS— or a single bond,
Sp is a linear spacer group with 1 to 16 carbon atoms,
the rings A, B and C denote each independently of each other (and in case A is present two times also these independently of each other) 1,4-phenylene being optionally substituted by one or two halogen atoms, cyano groups or $C_{1-6}$alkyl groups, $C_{1-6}$-alkoxy groups or $C_{1-6}$-alkanoyl groups wherein one or more H atoms may be substituted by F or Cl, or denote 1,4-cyclohexylene,
$Z^1$ and $Z^2$ are each independently of each other (and in case $Z^1$ is present two times also these independently of each other) —CH$_2$CH$_2$—, —COO—, —OCO—, —OCH$_2$—, —CH$_2$O—, —CH=CH—, —CH=CH—COO—, —OCO—CH=CH—, —C≡C— or a single bond,
R is an optionally fluorinated achiral alkyl, alkoxy or alkenyl group with 1 to 12 C atoms or denotes halogen or cyano or has one of the meanings given for P—X—(Sp—Y)$_m$—,
m is 0 or 1, and
n is 0, 1 or 2, b) a circular UV polarizer, wherein said component B comprises at least one compound of formula II:

II in which P, X, Y, $Z^1$, $Z^2$, n and m, and the rings A, B and C have the meaning given for formula I directly above and Sp* is an achiral or chiral spacer group with 1 to 16 carbon atoms, and R* is an achiral or chiral alkyl, alkoxy or alkenyl group with 1 to 12 C atoms or denotes halogen or cyano or has one of the meanings given for P—X—Sp*—Y—, with the proviso that at least one of the groups R* and Sp* is chiral, or alternatively component B comprises at least one mesogenic compound containing a chiral group of formula III:

III wherein P, X, Sp, Y, m, A, $Z^1$ and n have the meaning given for formula I directly above, x is 1 or 2 and G is a chiral structure element selected from the following groups:

for x=1, a cholesteryl group,

III1

III2 a terpenoid radical such as, for example, menthol, a group based on citronellol,

III3 or an ethylenglycol derivative

III4 wherein $R^1$ is an alkyl radical with 1 to 12 C atoms, and for x=2 a sugar derivative such as, for example, a group based on 1,4:3,6-Dianhydro-D-sorbitol,

III5 c) a circular UV polarizer, the film thickness of which is about 2 to 15 μm, in particular 3 to 10 μm.

In a particularly preferred embodiment, the component A is a composition of at least two compounds of formula I having two terminal polymerizable groups of formula P—X—Sp—Y—, in which the spacer groups have different chain length.

The achiral compounds of formula Ia are particularly preferred:

Ia in which P, X, Sp, Y and m have the meaning given for formula I and L is halogen, CN or alkyl, alkoxy or alkanoyl each having up to 6 carbon atoms which is unsubstituted or mono- or polysubstituted by F or Cl, and r is 0, 1 or 2.

The chiral compounds of formula IIa are particularly preferred:

IIa in which P, X, L, r and m have the meaning given and Sp* is a chiral spacer group.

In the above mentioned formulae I, II, Ia and IIa the following definitions are preferred:

Sp is preferably a group of formula —(CH$_2$)$_s$—, in which s is an integer of 1 to 12,

R* is preferably 2-methylbutyl or a group of formula P—X—Sp*—Y—, in which P, X and Y have the meaning given and Sp* is a chiral spacer group.

Sp* is preferably a group of formula —(CH$_2$)$_s$—C*H CH$_3$—(CH$_2$)$_t$—, in which s and t are each integers of 1 to 12 being different from each other.

P is preferably selected from CH$_2$=CW—, CH$_3$—CH=CW— and the structural elements 1 and 2

1

2 in which W denotes H, Cl or CH$_3$.

Particularly preferred polymerizable groups P—X are selected from acrylate, metnacrylate, vinyl, vinyloxy, propenyl, propenyloxy, epoxy and styryl, very particular preferably from acrylate, methacrylate, propenyloxy and epoxy.

L is preferably F, Cl, CN, NO$_2$, CH$_3$, C$_2$H$_5$, OCH$_3$, OC$_2$H$_5$, COCH$_3$, COC$_2$H$_5$, CF$_3$ and OCF$_3$, in particular F, CH$_3$, OCH$_3$ and COCH$_3$.

The films of the instant invention can be prepared according to the following method, for example:

A suitable mixture of nematic reactive mesogens and chiral dopants is formulated such that the desired reflection wavelength is obtained when the mixture is melted into the cholesteric phase. A small amount (e.g., 1–5%) of suitable photoinitiator is added. This mixture is then dissolved in a suitable solvent, such as toluene or methyl ethyl ketone. Typically, a 10–30% solution of solids is used. This solution is filtered through a 0.2 micron pore size filter. Undirectionally rubbed polyimide coated onto glass or plastic sheet is coated with the above solution. The solution can be spin coated, Meyer bar coated, Baker bar coated or any other standard coating technique can be used (e.g., gravure or reverse roll or micro gravure). The thickness of the web coating respectively the conditions of the other coating methods are such that after evaporation of the solvent, preferably a 3–5 micron cholesteric film remains. After evaporation of the solvent at, for example, 60–100° C., a second similarly aligned substrate is placed on the top of the coating and by a combination of shearing and heating, the film is aligned into a planar or Grandjean texture. the aligned cholesteric liquid crystal is then irradiated with UV light of appropriate wavelength for the photoinitiator used and a polymer film produced. The aligned cholesteric liquid crystal is then irradiated with UV light of appropriate wavelength for the photoinitiator used and a polymer film produced. The film can be de-laminated from the substrate and bonded to the quarter wave foil (QWF), or used as made providing the substrates are UV transparent.

The polymerization of the precursor can be initiated by the use of a thermal initiator as initiating component C. Such thermal starters are widely known.

For the polymerization initiating component C in general any photoinitiator can be used that decomposes when exposed to actinic radiation. These photoinitiators are commercially available in a wide variety.

For the instant invention it is rather important that in case a photoinitiator is used as initiating component C it is properly selected. It preferably should absorb light in the visible spectral range to limit any possible interference with the function of the chiral systems as UV polarizers. Such undesired effects might e.g. result from the cholesteric film reflecting just that part of UV radiation which would be required for the photoinitiating step if the photoinitiator is not properly selected. On the other hand residual photoinitiator might lead to undesired absorption of the UV radiation in the final operation of the system.

Preferably the photoinitiator component C comprises at least one compound selected from the following group of formulae IVa to IVd In addition to photoinitiators or thermal initiators the polymerizable composition can also comprise one or more other suitable components such as, for example, catalysts, stabilizers, co-reacting monomers, surface-active compounds or sensitizers such as, for example ITX (Isopropyl thioxanthone) to aid curing.

It is alternatively possible to add, for example, a quantity of up to 20% by weight of a nonpolymerizable liquid-crystalline material to adapt the optical properties of the polymer.

It is also possible to add up to 20% of a non mesogenic compound with two or more polymerizable functional groups to increase crosslinking of the polymers. Typical examples for difunctional non mesogenic monomers are alkyldiacrylates or alkyldimethacrylates with alkyl groups of 1 to 20 C atoms. Typical examples for non mesogenic monomers with more than two polymerizable groups are trimethylpropanetrimethacrylate or pentaerythritoltetraacrylate.

Besides the reactive liquid crystals described above as the constituents of component A of the polymer precursor it is obviously also possible according to the instant invention to use chiral, reactive, non-liquid crystalline compounds. These are well known by the expert.

The helical twisting power of chiral substances is given in $\mu m^{-1}$ at 20° C. throughout the text unless explicitly stated otherwise.

The chiral component used, preferably does not absorb UV radiation. Especially compounds which do not absorb in the range of long UV wavelengths, namely in the region of 360 to 400 nm are preferred. Obviously compounds which do not absorb at all in this range would be preferred. As, however, this ideal condition is hardly met, compounds with only small absorption in this region are preferred. Further compounds with a high helical twisting power (HTP) are preferred, as their influence on the properties of the mixture especially the mesogenic properties, e.g. the clearing point, is rather small. Examples of such chiral, reactive, non liquid crystalline compounds are the following compounds which are sorbitols and menthols of formulae V and VI:

wherein $A^1$ and $A^2$ are independently of each other 1,4-phenylene and trans 1,4-cyclohexylene and wherein n is 1 to 8.

The HTP of these sorbitols is about 60–70. The preferred benzoic acid for the sorbitols is cyclohexanoic acid. Also for the menthol preferably a cyclohexyl ring is used as $A^1$. The HTP of menthols is about 20.

Other suitable chiral compounds are those containing groups like 2-octanol, such as of formula VII, (and 2-methyl butyl) but these generally are of lower HTP.

VII

Also cholesterol and steroids in general can be used e.g. in compounds such as:

VIII

IX n = 1 to 8

These compounds VII to IX typically have HTP values of about 5–10.

In addition to or alternatively to the chiral, reactive, non-liquid crystalline compounds, also chiral, non-reactive, non-liquid crystalline compounds may be used. However they are used preferably together with the former compounds or with the chiral reactive liquid crystals as described above.

It is also possible to add, in addition to or alternatively to these compounds, chiral, non-reactive liquid crystalline compounds, like e.g. commercially available chiral dopants, to the polymerizable composition.

Examples of compounds which can be used as chiral, reactive, liquid crystals according to the instant application are compounds of formulae X and XI

X

XI

Also the citronellol based compounds can be used. Of course these materials are not ideal for all applications as they contain somewhat conjugated structures and do absorb in the near UV to some extent.

Compounds containing cyclohexyl rings instead of phenyl rings are preferred for most applications.

Typical examples of chiral, non-reactive, liquid crystals which can be used are the chiral dopants R-2011, CE2 and CE all available from Merck KGaA, Darmstadt.

CE2

CE Compounds

R-2011 has a HTP of about 11 $\mu m^{-1}$, CE2 has a HTP of about 10 $\mu m^{-1}$ and CE compounds of about 5 to 7.

Examples for chiral, non-reactive, non-liquid crystals which are mesogenic compounds are again sortibols and menthols. Also compounds such as cholesterol esters, for example, R-1011 available from Merck KGaA etc., can be used as co-dopants. Of course, the HTP of these compounds has to be high so that the material is not present in high concentrations. Otherwise, it may phase separate when the polymer is formed. Examples are:

c) 0.01 to 10, preferably 0.1 to 5% by weight of photo-initiator or thermal initiator component C.

The ratio of components A and B determines the reflection maximum of the composition and depends on the pitch of component B. Within the preferred ranges given above the ratio of component A to component B should therefore be chosen such that the reflection maximum of the composition is between 320 and 440 nm.

On the other hand, the use of monoreactive and direactive polymerizable compounds of group A and B (i.e. compounds having one or two polymerizable groups P respectively) determines the optical properties of the circular polariser, in particular their temperature dependence and the mechanical stability of the polarizer film. It is therefore sometimes useful to vary the crosslinking by using different ratios of mono- and direactive compounds of formula I and/or II.

In a preferred embodiment the polymerizable composition comprises at least one monoreactive and at least one In a preferred embodiment, the circular UV polarizer is based on polymerized mesogens obtained by UV curing of a polymerizable composition comprising
 a) 15 to 95%, preferably 20 to 85%, in particular 25 to 80% by weight of mesogenic component A
 b) 5 to 85%, preferably 10 to 75%, in particular 15 to 70% by weight of mesogenic component B, and direactive compound of formula I and/or II. In another preferred embodiment the polymerizable composition comprises only direactive compounds of formula I and/or II. In another preferred embodiment the polymerizable composition comprises at least two monoreactive compounds of formula I and/or II.

The inventive circular UV polarizer, when irradiated with UV light of a wavelength in the range of the maximum reflection wavelength of the polymerized mesogens, reflects half of the intensity of the incident light as left-handed or right-handed circularly polarized light. The other half is transmitted as circularly polarized light of the opposite handedness.

In a preferred embodiment, the circular UV polarizer according to the present invention is laminated to a quarter wave foil having a retardation value of 0.25 times of the wavelength of light transmitted by the circular polarizer to provide linear polarized light. Contrast ratios of about 40:1 can be obtained by this combination. The contrast ratio can be determined by rotating a second identical set of circular UV polarizer and quarter wave foil, placed opposite the set being measured, by angles of multiples of 90°. These can be further increased by using a UV linear polarizer obtainable by UV curing of a polymerizable composition which comprises 60 to 99% by weight of a liquid crystalline component composed of one or more achiral mesogenic compounds having at least one polymerizable end group optionally linked via a spacer to the mesogenic core, 0.1 to 30% by weight of a dichroic dye component that absorbs light in the UV region, and 0.01 to 10% by weight of a photoinitiator.

The additional linear polarizer preferably exhibits a polarization contrast ratio of about 1:10. The combination of the circular polarizer, quarter wave foil and linear polarizer yields a contrast ratio of 400:1, i.e., the product of the individual polarizers in the stack, 40:1×10:1=400:1. This technique has the advantage that the linear polarizer does not have to absorb as much UV light, thus preventing overheating and increasing its life time.

In another preferred embodiment, the UV polarizer according to the invention is combined with a UV lamp and a reflector that re-reflects the circularly polarized light, which was reflected from the inventive circular UV polarizer, with a change of its handedness. The re-reflected light will then be transmitted by the circular UV polarizer. In this way, most of the UV light is converted to circularly polarized light of a single handedness or, if a $\lambda/4$ plate is used, to linearly polarized UV light.

In another preferred embodiment the UV lamp is combined with a diffusor that depolarizes the light coming from the reflector. This light is then again directed onto the circular UV polarizer and split up in a reflected and a transmitted portion. In this way, too, most of the UV light is converted to circularly polarized light of a single handedness or if a $\lambda/4$ plate is used, to linearly polarized UV light.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding European application No. 96110805.7, filed Jul. 4, 1996 is hereby incorporated by reference.

EXAMPLES

Embodiments of the present invention will now be described, by way of example only.

Without further elaboration, it is believed that one skilled in the art can, using the preceding description, utilize the present invention to its fullest extent. The preferred specific embodiments are, therefore, to be construed as merely illustrative, and not limitative of the disclosure in any way whatsoever.

The following abbreviations are used:

$\lambda$=wavelength of actinic irradiation

I=lamp power

The following acronyms are used to define the different components of the liquid crystalline composition according to the invention:

Compound A-1

Compound A-2

Mixture M-1 of compounds A-1 to A-4

A-1: n = m = 3 (25%);   A-2: n = m = 6 (25%)
A-3: n = 3, m=6 (25%)  and  A-4: n = 6, m = 3 (25%).

Compound B-1

Compound C-1

Compound D-1

Compound E-1

Irgacure 184 and Irgacure 651 are commercially available photoinitiators from Ciba Geigy AG.

R-1011 is a liquid crystalline chiral dopant with a polar fluorinated terminal group available from Merck KGaA.

| Acronym | wt. % |
|---|---|
| B-1 | 53.00 |
| A-1 | 46.00 |
| Irgacure 184 | 1.00 | is sandwiched between two microscope slides and exposed to UV light ($\lambda$=370–390 nm, I=6 mW/cm$^2$) for five minutes at 75° C. The maximum wavelength of reflection of the resulting film is at 370 nm.

Example 2

A polymerizable composition consisting of:

| Acronym | wt. % |
|---|---|
| B-1 | 49.50 |
| A-1 | 49.50 |
| Irgacure 651 | 1.00 | is sandwiched between two microscope slides and exposed to UV light ($\lambda$=370–390 nm, I=6 mW/cm$^2$) for five minutes at 75° C.

The maximum wavelength of reflection of the resulting film is at 404 nm.

Example 3

Figure 1:
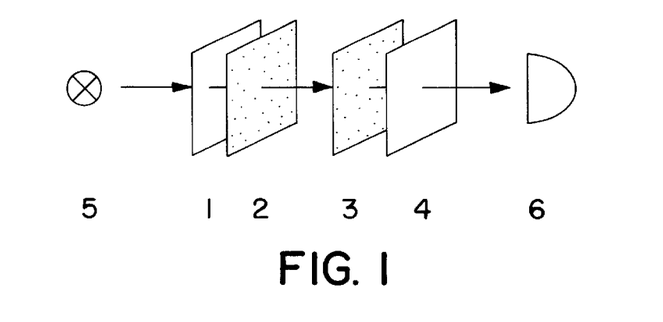
FIGS. 1 and 2 show the set-up for Example 3 and the contrast ratio results thereof.

As depicted in FIG. 1, two samples of the cholesteric film of example 1 (1 and 4) are combined each with a quarter wave foil whose retardation is 90 nm. The first quarter wave foil 2 has a first axis at 0° to the vertical, whereas the second quarter wave foil 3 has a first axis at 0° and 90° to the vertical. These two combinations of films are placed in a spectrophotometer comprising a source of unpolarized light 5 and a detector for the UV and visible range of wavelengths 6. The films are arranged such that the polarized light transmitted by the first combination of films 1 and 2 is incident upon the second combination of films 3 and 4.

Figure 2:
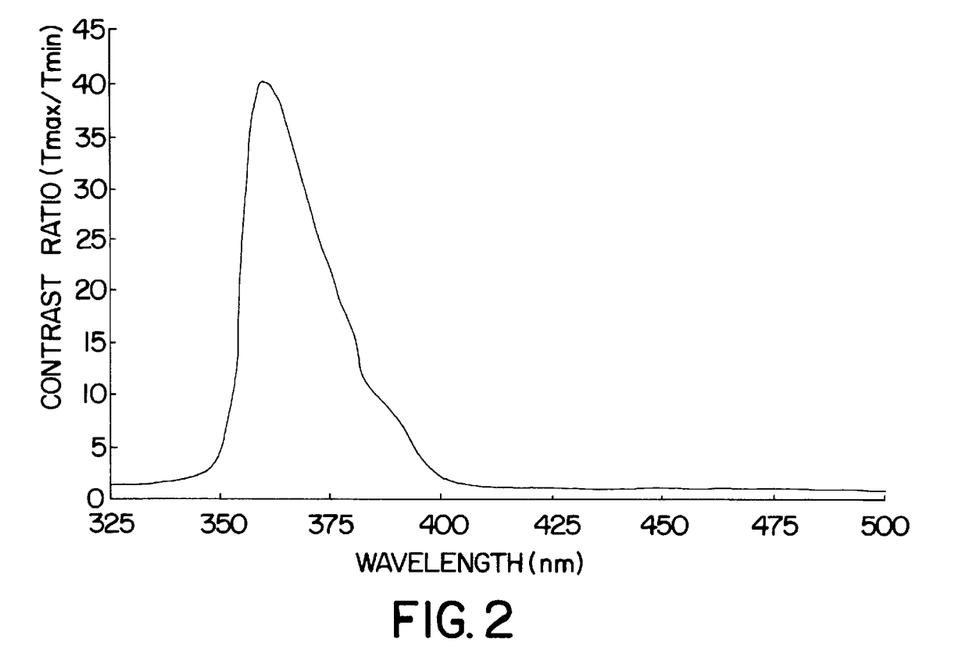

The contrast ratio for the combination of films 1, 2, 3 and 4 according to the setup of FIG. 1 in dependence of the wavelength of the incident light from the light source 5 is depicted in FIG. 2. As can be seen, the maximum contrast ratio is 40:1 in the UV region at a wavelength of about 360 nm.

Example 4

A polymerizable composition using a reactive liquid crystal (C-1) and a chiral, non-reactive, non-liquid crystal (D-1) was used consisting of:

| Acronym | wt. % |
|---|---|
| C-1 | 65.00 |
| A-2 | 32.00 |
| D-1 | 2.00 |
| Irgacure 184 | 1.00 |

This mixture was cured as a thin (5 $\mu$m) film using a Dr. H önle metal halogen lamp for 20 seconds between two glass substrates to give a cholesteric polymer film with a maximum reflectance wavelength of 380 nm.

Example 5

A polymerizable composition of chiral non-reactive, non-liquid crystal dopants (D-1 and R-1011) in a nematic mixture composed of mono (E-1) and diacrylates (A-2)

| Acronym | wt. % |
|---|---|
| E-1 | 10.00 |
| A-2 | 81.20 |
| D-1 | 3.90 |
| R-1011 | 3.90 |
| Iracure 651 | 1.00 | was cured as in Example 4 to give a film with a maximum reflection wavelength of 385 nm.

What is claimed is:

1. A liquid crystal circular UV polarizer based on polymerized mesogens obtained by curing, with actinic radiation or heat, of a polymerizable composition comprising:
    a) a mesogenic component A comprising one or more achiral mesogenic compounds having at least one polymerizable end group linked, optionally via a spacer group to the mesogenic core,
    b) a component B comprising one or more chiral compounds in such an amount that the maximum wavelength of reflection ($\lambda_{max}$) of the composition is between 320 and 440 nm, inclusive, and
    c) a photoinitiator or thermal initiator component C.

2. A circular UV polarizer according to claim 1, wherein component A comprises at least one compound of formula I:

in which

P is a polymerizable group,

X and Y are each independently —O—, —S—, —COO—, —OCO—, —OCOO—, —SCO—, —COS— or a single bond, Sp is a linear spacer group with 1 to 16 carbon atoms, A, B and C each independently, denote 1,4-phenylene optionally substituted by one or two halogen atoms, cyano groups, $C_{1-6}$-alkyl groups, $C_{1-6}$-alkoxy groups or $C_{1-6}$-alkanoyl groups wherein one or more H atoms may be substituted by F or Cl, or denote 1,4-cyclohexylene, $Z^1$ and $Z^2$ are each independently —CH$_2$CH$_2$—, —COO—, —OCO—, —OCH$_2$—, —CH$_2$O—, —CH=CH—, —CH=CH—COO—, —OCO—CH=CH—, —C≡C— or a single bond,

R is an optionally fluorinated achiral alkyl, alkoxy or alkenyl group with 1 to 12 C atoms or denotes halogen or cyano or has one of the meanings given for P—X—(Sp—Y)$_m^-$, m is 0 or 1, and n is 0, 1 or 2.

3. A circular UV polarizer according to claim 2, wherein component A comprises a composition of at least two compounds of formula I having two terminal polymerizable groups of formula P—X—Sp—Y—, wherein the spacer groups have different chain length.

4. A circular UV polarizer according to claim 2, wherein component A comprises at least one compound of formula I$a$ in which P, X, Sp, Y and m have the meaning given for formula I, L is independently, halogen, CN or alkyl, alkoxy or alkanoyl, each having up to 6 C atoms which is unsubstituted or mono- or polysubstituted by F or Cl, and r is 0, 1 or 2.

5. A circular UV polarizer according to claim 2, wherein said component B comprises at least one compound of formula II:

in which P, X, Y, $Z^1$, $Z^2$, n and m, and the rings A, B and C have the meaning given and Sp* is an achiral or chiral spacer group with 1 to 16 carbon atoms, and R* is an achiral or chiral alkyl, alkoxy or alkenyl group with 1 to 12 C atoms or denotes halogen or cyano or has one of the meanings given for P—X—(Sp*)$_m$—Y—, with the proviso that at least one of the groups R* and Sp* is chiral.

6. A circular UV polarizer according to claim 2, wherein component B comprises a composition of at least one compound of formula II$a$ IIa in which P, X, and m have the meaning given, L are independently halogen, CN or alkyl, alkoxy or alkanoyl, each having up to 6 C atoms which is unsubstituted or mono- or polysubstituted by F or Cl, r is 0, 1 or 2, and Sp* is a chiral spacer group.

7. A circular UV polarizer according to claim 1, wherein said polymerized mesogens are obtained by UV curing of a polymerizable composition comprising
   a) 15 to 95% by weight of liquid crystalline component A,
   b) 5 to 85% by weight of liquid crystalline component B, and
   c) 0.01 to 10% by weight of photoinitator component C.

8. A circular UV polarizer according to claim 1, having a film thickness of about 2 to 15 $\mu$m.

9. A circular UV polarizer of claim 1, having a film thickness of 3 to 10 $\mu$m.

10. A spatial circular UV modulator which comprises a circular UV polarizer according to claim 1.

11. A device for producing linearly polarized UV light comprising
   a) a UV light emitting source,
   b) a circular UV polarizer according to claim 1,
   c) a $\lambda$/4 plate with a retardation value of approximately 0.25 times of the wavelength of light that is transmitted by said circular UV polarizer,
   d) a reflector which re-reflects the circular polarized UV light reflected by said circular UV polarizer with inversion of its handedness,
   e) optionally a diffusor, and
   f) optionally a linear UV polarizer.

12. A device for producing linearly polarized UV light according to claim 11, wherein the linear UV polarizer is obtained by UV curing of a polymerizable composition which comprises 60 to 99% by weight of a liquid crystalline component composed of one or more achiral mesogenic compounds having at least one polymerizable end group optionally linked via a spacer to the mesogenic core, 0.1 to 30% by weight of a dichroic component that absorbs light in the UV region, and 0.01 to 10% by weight of a photoinitiator or a thermal initiator.

13. A circular UV polarizer of claim 1, wherein the polymerizable composition is cured by UV curing.

14. A circular UV polarizer of claim 2, wherein in formula I, Sp is —$(CH_2)_s$—, where s is an integer of 1 to 12.

15. A circular UV polarizer of claim 2, wherein in formula I, P—X— is an acrylate, methacrylate, vinyl, vinyloxy, propenyl, propenyloxy, epoxy or styryl group.

16. A circular UV polarizer according to claim 1, wherein component C is a photoinitiator which absorbs light in the visible spectral range.

17. A circular UV polarizer according to claim 1, wherein said polymerized mesogens are obtained by UV curing of a polymerizable composition comprising:
   a) 20 to 85% by weight of liquid crystalline component A,
   b) 10 to 75% by weight of mesogenic compound B, and
   c) 0.1 to 5% by weight of photoinitiator or thermal initiator component C.

* * * * *